United States Patent [19]

Skånberg et al.

[11] Patent Number: 5,664,803
[45] Date of Patent: Sep. 9, 1997

[54] GAS GENERATOR, PARTICULARLY FOR AN AIR BAG

[75] Inventors: Torbjörn Skånberg, Hovås; Lennart Karlsson, Alingsås, both of Sweden

[73] Assignee: Autoliv Development AB, Vårgårda, Sweden

[21] Appl. No.: 549,683

[22] PCT Filed: May 11, 1994

[86] PCT No.: PCT/SE94/00456

§ 371 Date: Jan. 5, 1996

§ 102(e) Date: Jan. 5, 1996

[87] PCT Pub. No.: WO94/26563

PCT Pub. Date: Nov. 24, 1994

[30] Foreign Application Priority Data

May 12, 1993 [GB] United Kingdom ............... 9309803

[51] Int. Cl.$^6$ ....................................... B60R 21/26
[52] U.S. Cl. .................. 280/737; 280/741; 137/68.13; 137/69; 222/3; 102/531
[58] Field of Search .................. 280/737, 736, 280/740, 741, 742; 137/69, 68.13, 68.23, 68.28, 68.19; 222/3, 541.3, 541.4; 102/530, 531, 202.5

[56] References Cited

U.S. PATENT DOCUMENTS

| | | | |
|---|---|---|---|
| 3,017,894 | 1/1962 | Chilcoat | 137/69 |
| 3,209,937 | 10/1965 | Hirst et al. | 137/69 |
| 3,774,807 | 11/1973 | Keathley et al. | 280/737 |
| 3,889,703 | 6/1975 | Keathley | 280/737 |
| 4,203,616 | 5/1980 | Okada | 280/737 |
| 4,289,327 | 9/1981 | Okada | 280/737 |
| 5,022,674 | 6/1991 | Frantom et al. | 280/737 |
| 5,230,531 | 7/1993 | Hamilton et al. | 280/737 |
| 5,273,312 | 12/1993 | Coultas et al. | 280/737 |
| 5,474,328 | 12/1995 | Nilsson | 280/737 |

FOREIGN PATENT DOCUMENTS

| | | |
|---|---|---|
| 0619205 | 10/1994 | European Pat. Off. . |
| 2211355 | 5/1973 | Germany . |
| 2253303 | 5/1973 | Germany . |
| 2319382 | 11/1973 | Germany . |
| 2339618 | 2/1974 | Germany . |
| 352032 | 12/1972 | Sweden . |
| 2281225 | 3/1995 | United Kingdom ............ 280/736 |

*Primary Examiner*—Brian L. Johnson
*Assistant Examiner*—Peter C. English
*Attorney, Agent, or Firm*—Spencer & Frank

[57] ABSTRACT

A gas generator includes a bottle containing compressed gas and an outlet passage through which the gas may leave the bottle; a housing supported within the bottle and having a side wall defining an inner housing space communicating with the outlet passage; a movable element disposed in the housing and being displaceable between an initial position and an advanced position; an externally actuatable triggering mechanism positioned in the housing for propelling the movable element from the initial position into the advanced position; an aperture provided in the side wall of the housing for establishing communication between an inner bottle space and the outlet passage; a sealing disc secured to the side wall and obturating the aperture for preventing communication between the inner bottle space and the outlet passage. The sealing disc has a surface flush with an inner face of the side wall of the housing. In the initial position of the movable element the sealing disc is pressed into engagement with the movable element by the pressure of the compressed gas in the inner bottle space. In the advanced position of the movable element the movable element is remote from the aperture, whereby pressure of the compressed gas in the bottle removes the sealing disc for allowing the compressed gas to flow out of the outlet passage. The direction of motion of the movable element is parallel to the surface of the sealing disc.

13 Claims, 6 Drawing Sheets

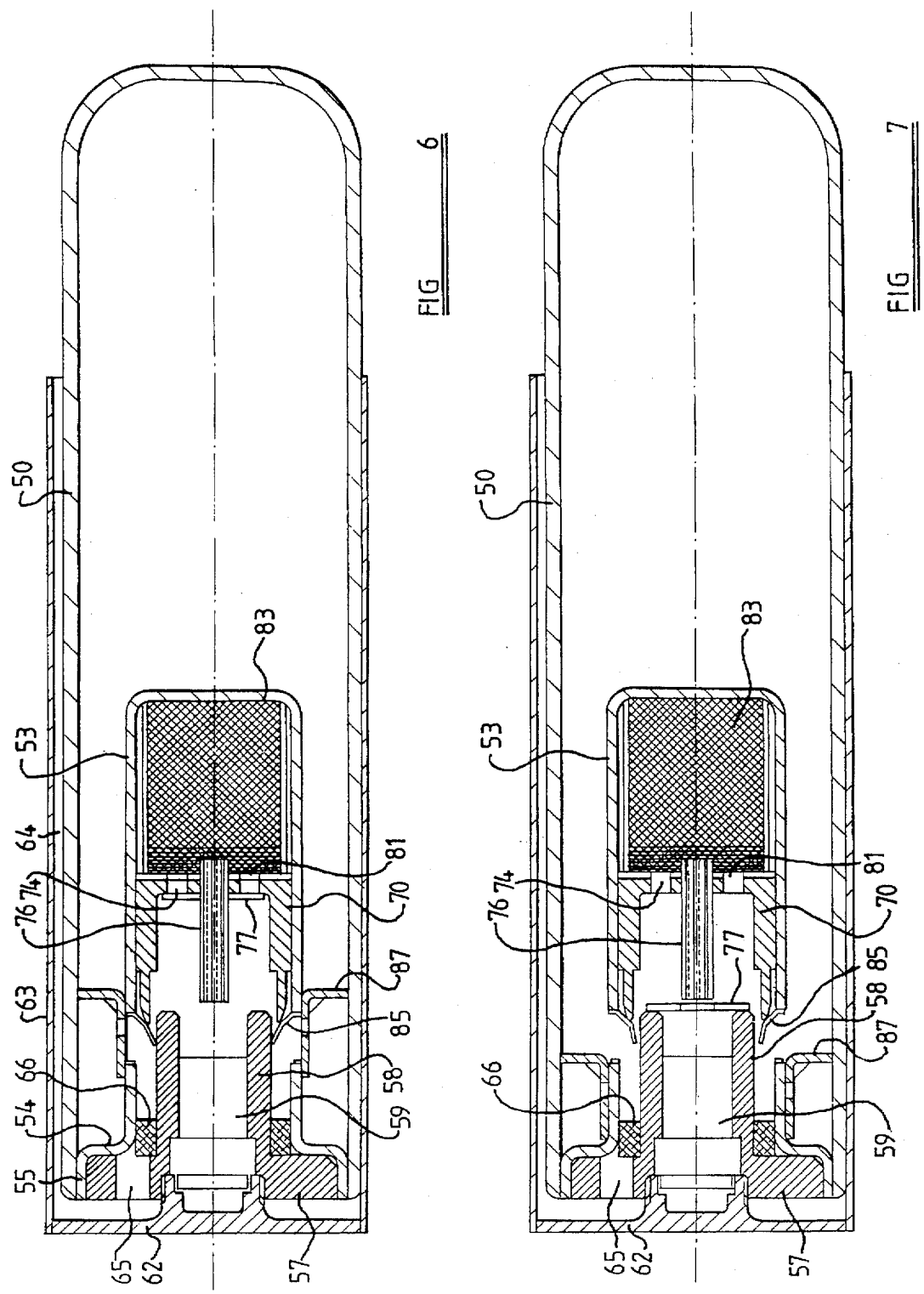

GAS GENERATOR, PARTICULARLY FOR AN AIR BAG

BACKGROUND OF THE INVENTION

The present invention relates to a gas generator and more particularly relates to a gas generator comprising a source of gas for inflating an air bag or the like.

An air bag is provided in a motor vehicle, mounted at a position in front of the driver or in front of a passenger of the vehicle, and a gas generater is provided adapted to inflate the air bag should an accident arise. The air bag then forms a protective cushion for the driver or passenger. The gas generator must be such that the air bag is inflated to a desired degree within a brief period of time.

SUMMARY OF THE INVENTION

The present invention seeks to provide a gas generator particularly for a vehicle air bag.

According this invention there is provided a gas generator comprising a bottle containing compressed gas, a housing within the bottle, the housing containing a movable element and triggering means, the movable element moving in response to activation of the triggering means, the housing having one or more apertures formed in the side wall thereof, in alignment with the initial position of the movable element, the or each aperture initially being sealed by a sealing disc, which sealing disc is biassed into engagement with the movable element by compressed gas, the arrangement being such that when the movable element moves from the initial position on activation of the triggering means, the part of the movable element engaging the sealing disc is moved away from the sealing disc and the or each disc may move under the effect of the pressure of the compressed gas to a position in which it no longer seals the aperture, thus opening the aperture and establishing a flow path for compressed gas from the bottle to an air bag to be inflated.

The disc may simply be moved by the pressure of the compressed gas to a position in which the disc no longer seals the aperture, or the disc may be torn or ruptured by the pressure of the compressed gas. In any event, the disc is finally in a position where it does not seal the aperture.

In the simple embodiment &f the invention the movable element may be moved by a biassing force from a spring, the triggering means being adapted to retain the movable element in position until the triggering means are activated, the triggering means then releasing the movable element, permitting the movable element to move under the bias applied by the spring. However, in a preferred embodiment, the movable element is a piston and the triggering means is a squib. The squib may be adapted to be electrically activated. On activation of the squib, gas is generated which moves the piston along a cylinder.

Preferably the housing contains a combustible material, the combustible material being arranged to be ignited in response to actuation of the squib, the combustible material being so located that as it combusts, it heats the compressed gas.

Conveniently the combustible material is a pyrotechnic material.

Advantageously the combustible material is a combustible fuel, the compressed gas containing oxygen, which oxygen is consumed as the fuel is burnt.

Conveniently the housing contains a fuse, the fuse being ignited in response to activation of the squib, the fuse in turn, after a predetermined delay, causing ignition of the combustible material.

Preferably the fuse extends directly to a pyrotechnic material.

In one embodiment the pyrotechnic material creates a flame, and a mixture of combustible fuel and compressed gas containing oxygen is directed into a combustion zone adjacent the flame.

Preferably the compressed gas is passed through a filter before leaving the gas generator.

Preferably the movable element incorporates a tapered portion adapted to engage the closure discs when the apertures are being opened, so that the apertures are opened gradually.

In order that the invention may the more readily understood and so that further features thereof may be appreciated, the invention will now be described, by way of example, with reference to the accompanying drawings.

BRIEF DESCRIPTION OF THE DRAWINGS

FIG. 6 is a view corresponding to FIG. 4 illustrating the embodiment of FIG. 4 shortly after being activated; and FIG. 7 is a view corresponding to FIG. 6 illustrating the gas generator of FIG. 4 a few moments later.

DESCRIPTION OF THE PREFERRED EMBODIMENTS

Figure 1:
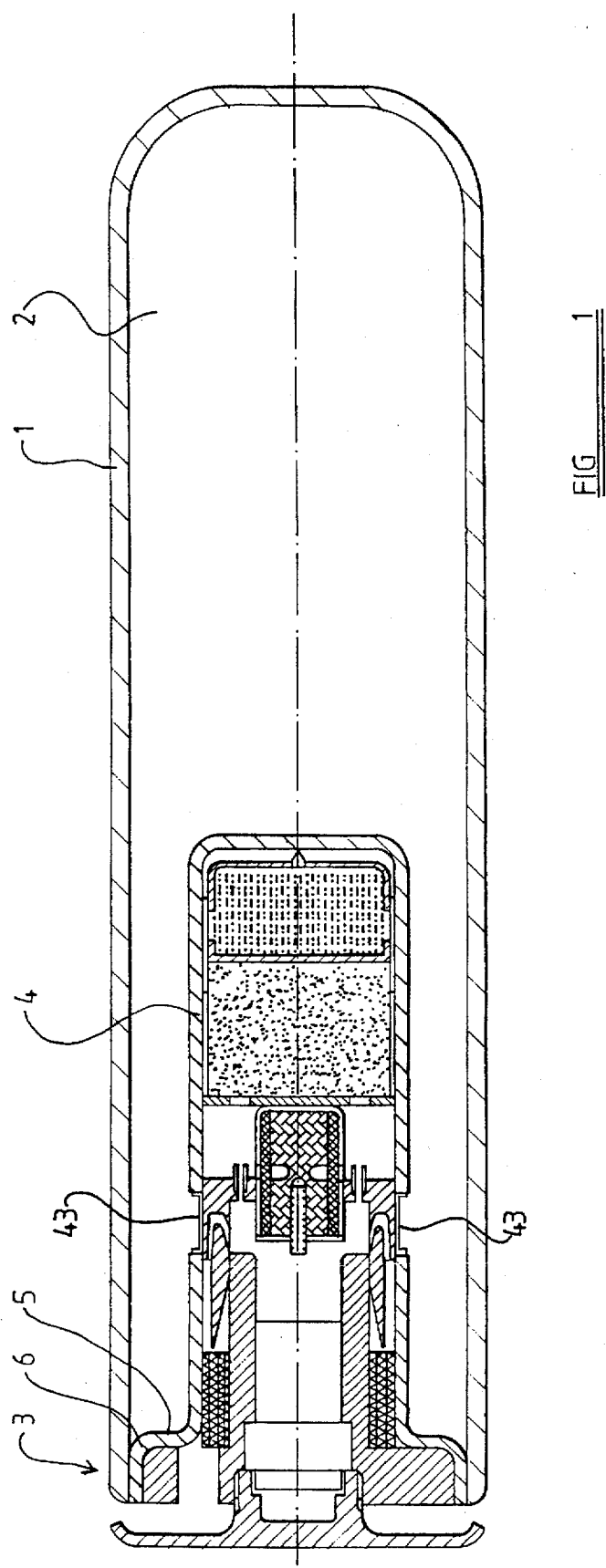
FIG. 1 is a sectional view of a gas generator in accordance with the invention in an initial condition.
Figure 2:
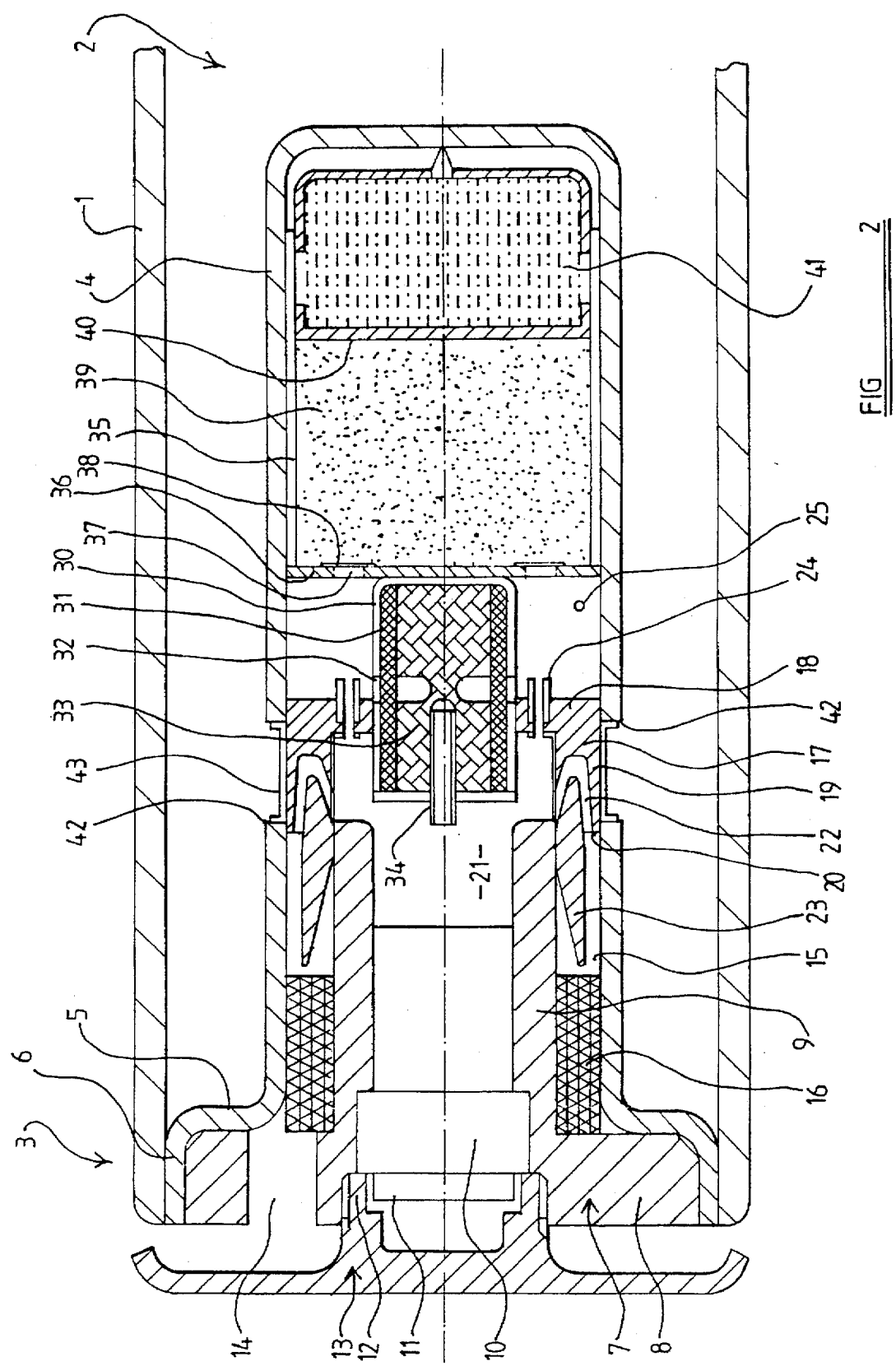
FIG. 2 is an enlarged view of part of FIG. 1.

Referring initially to FIGS. 1 and 2, a gas generator comprises a cylindrical gas bottle 1 which is closed at one end and which defines a hollow interior 2, that hollow interior containing compressed gas. The gas may comprise compressed air, but preferably comprises compressed air with added oxygen. Thus, the gas may comprise substantially 50% nitrogen, which is am inert gas, and substantially 50% oxygen, but the precise composition of the gas may vary. A high oxygen content gives good combustion properties. The gas may have a pressure of approximately 200 bars.

The cylindrical gas bottle 1 has a closed end and an open end 3. Received within the open end 3 is a tubular housing 4 formed of appropriate material, the tubular housing having, adjacent the open end of the bottle 3, an outwardly directed flange 5 carrying a terminal lip 6 which is in substantially sealing-tight engagement with the interior of the open end 3 of the bottle 1. A plug 7 having a terminal flange 8 and an axially extending hollow spigot 9 is inserted into the end of the tubular housing 4, the flange 8 of the plug 7 serving to force the lip 6 of the housing 4 into firm engagement with the interior of the open end 3 of the gas bottle 1. The hollow spigot 9 contains a cylindrical insert 10, which comprises an electrically activated squib. The exterior of the insert 10 defines a seat 11 which receives a tubular projection 12 formed integrally with a cover 13, the cover 13 comprising a disc-like portion which is spaced from the open end 3 of the bottle 1.

A plurality of evenly spaced apertures or air passages 14 are formed in the flange 8 of the plug 7, communicating with a space 15 located between the spigot 9 of the plug 7 and the interior of the tubular housing 4. A filter 16 is mounted in the space 15 adjacent the under surface of the flange 8 of the plug 7, the filter 16 thus filtering any air or gas moving from the space 15 through the air passages 14.

A piston 17 is provided, comprising a disc-like portion 18 which is a sliding and substantially sealing fit within the interior of the tubular housing 4, the disc-like portion 18 carrying a peripheral rearwardly extending (i.e. extending to the left as illustrated) substantially tubular flange 19. The rearmost part of the flange 19 is received within the space 15. The exterior of the rearmost part of the flange 19 is cut away forming a step 20. To the rear (i.e. to the left as shown) of the step 20 the flange 19 is of lesser external diameter, and is thus spaced from the interior of the tubular housing 4. A space 21 is defined by the interior of the tubular flange 19, and a plurality of evenly spaced cranked air passages 22 are defined by that flange extending from the space 21, to the step 20, so that the passages communicate with the space 15. The free ends of the rearwardly extending tubular flange 19 are tapered on the interior of the flange as shown at 23, the rear end of the flange 19 thus forming a diverging open mouth.

A plurality of evenly spaced small tubes 24 are provided which extend through the disc-like portion 18, providing a passage communicating with the space 21 defined by the rearwardly extending tubular flange 19, and a further space 25 located in front of the piston. The forward end of each tube 24, located in the space 25, may be sharpened. Each tube 24 is aligned with a respective air passage 22. There may typically be two diametrically opposed tubes 24 each associated with a respective diametrically opposed air passage 22.

The centre of the disc-like portion 18 is cut away, to define a circular aperture which slidingly receives an igniter housing 30 of cylindrical form. A tubular sleeve 31 of filter material is present within the housing 30 adjacent the cylindrical outer wall of the housing 30. At least two diametrically opposed apertures 32 are formed in the side wall of the housing 30. The apertures 32 are aligned with the tubes 24 and air passages 22. The centre of the housing 30 contains a pyrotechnic material 33, and a fuse 34 present within the pyrotechnic material. The fuse projects through the closed end of the housing towards the insert 10.

A fuel tank 35 is located in the tubular housing 4, having an end wall 36 which extends transversely across the interior of the tubular housing 4, immediately in front of the igniter housing 30. The end wall 36 is provided with apertures 37 substantially aligned with the small tubes 24, the inner parts of the apertures 37 being sealed by thin sealing discs 38 which are soldered in position; A combustible fuel is present within the space 39 within the tank 35, this fuel being either liquid or powder. A sliding partition 40 is provided within the tank 35, slidable axially, defining the space 39. A further space 41 is defined within the tank 35 on the opposite side of the partition 40 to the space 39. The space 41 contains compressed gas or the like. Alternatively the space 41 may contain a spring biassing the partition 40 towards the left, as illustrated. Thus the partition 40 is biassed to compress the fuel in the space 39.

A plurality of apertures 42 are formed in the side wall of the tubular housing 4, adjacent the rearwardly extending tubular flange 19 of the piston 17. Each aperture 42 is sealed by a thin sealing disc 43. Each disc 43 is made of steel and is approximately 0.25 mm thick. Each disc is flanged and the flanges are welded or soldered to the housing 4. The interior of each disc is flush with the interior of the housing 4. The apertures 42 are evenly spaced and are substantially aligned with the tubes 24 and air passages 22. The piston 17, in its initial position illustrated in FIGS. 1 and 2, is substantially aligned with the apertures 42. Each sealing disc 43 is subjected to pressure from the pressurized gas contained within the volume 2 defined by the gas bottle 1, thus pressing the disc 43 firmly against the exterior of the piston 17. Thus each disc 43 is biassed into engagement with the piston by the effect of the pressure of the compressed gas.

When an air bag provided with a gas generator as described above is to be inflated, initially an electric signal is passed to the squib contained within the insert 10. The electric signal may be generated by a sensor which responds to severe deceleration or to an impact. The squib ignites, thus generating gas under pressure which is fed into the space 21. This causes the piston 17 to move forwards axially of the inner tubular housing 4, the piston thus moving to the right as illustrated in a direction parallel to the inner surface of each sealing disc 43. Also the fuse 34 is ignited.

Figure 3:
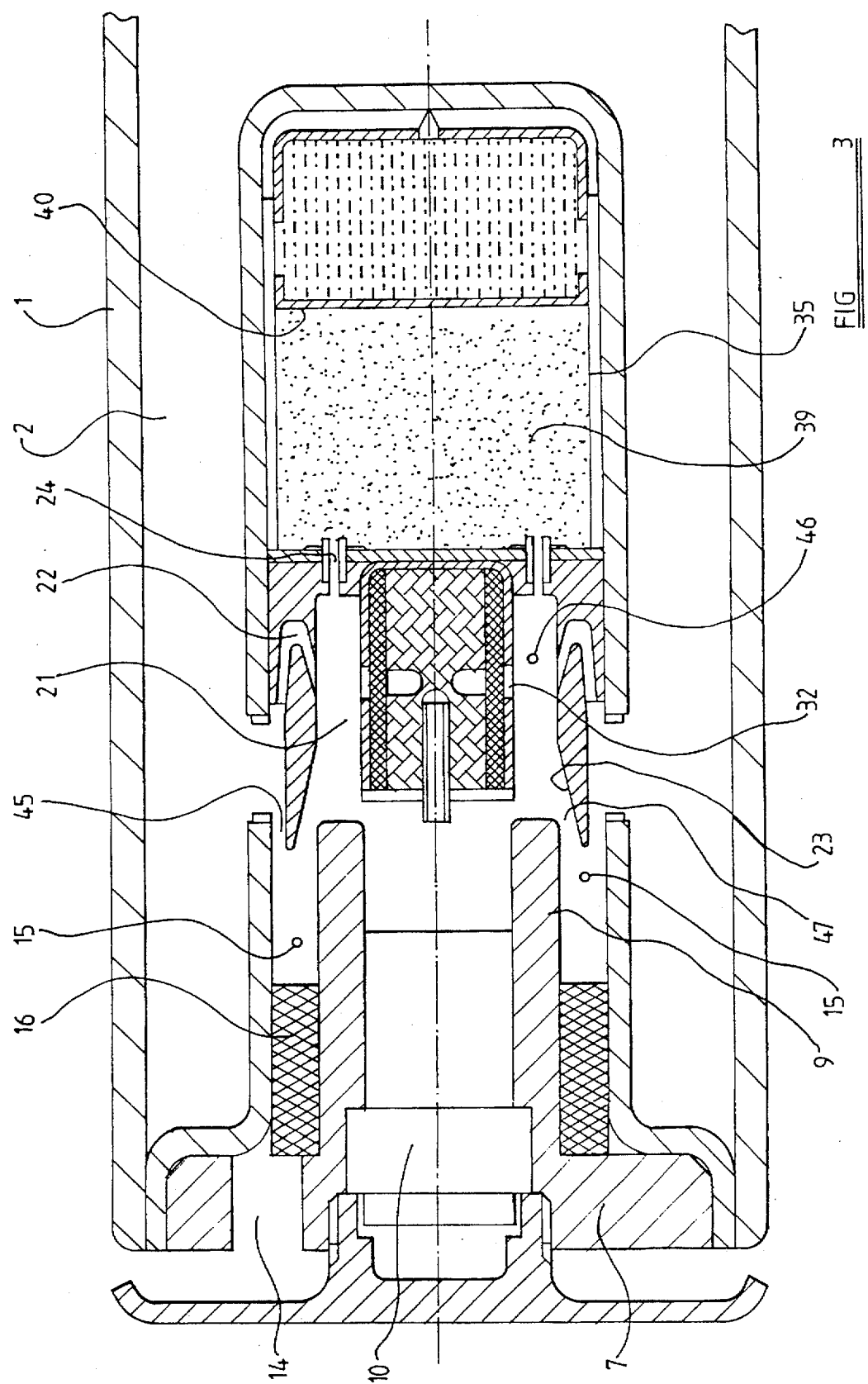
FIG. 3 is a corresponding enlarged view illustrating the gas generator of FIGS. 1 and 2 in an operative condition.
Figure 4:
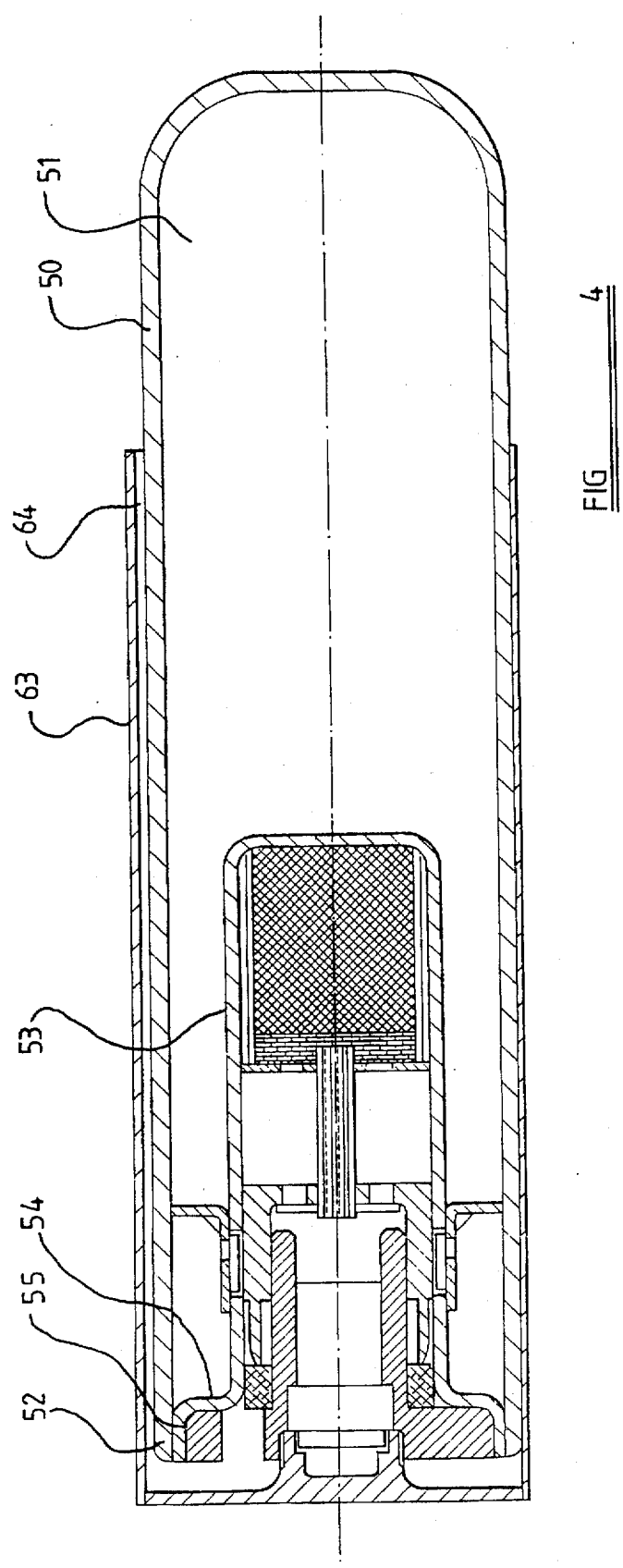
FIG. 4 is a view corresponding to FIG. 1 illustrating another embodiment of the invention in an initial condition.

The piston moves forwardly to the position illustrated in FIG. 3.

It is to be observed that when the piston 17 has moved forwardly the part of the piston initially supporting the discs 43 sealing the apertures 42 has moved forwardly, and the rearward part of the tubular flange 19 of the piston 17, which is of lesser diameter, is then located adjacent the apertures 42. Because the part of the piston previously engaging the sealing discs has moved away from the sealing discs, and because of the form of the piston, the discs 43 are no longer supported from the inside of the housing 4 and are subjected to a high pressure of 200 bar from the exterior of the housing 4. The discs 43 thus move from their initial positions, or break and form openings, in either event permitting gas from the interior 2 of the gas bottle 1 to flow through the apertures 42. The flow of gas passes partially through the cranked air passages 22, and partially through a passage 45 defined between the inwardly stepped reduced diameter rearmost part of the piston and the housing 4 directly towards the annular space 15 and the filter 16. Gas flows out through the air passages 14 and starts to inflate the air bag.

It is also to be observed that as the piston 17 moves forwardly to the position illustrated in FIG. 3, shortly after the discs 43 have moved from their initial positions or broken, the small tubes 24 puncture the thin discs 38 sealing the space 39 containing the combustible fuel. The combustible fuel is subjected to pressure from the movable partition 40 because the space 41 behind the movable partition 40 either contains a compressed gas or a spring. Thus, fuel then passes through the small tubes 24 and into the space 21 within the interior of the piston.

With the piston in the position illustrated in FIG. 3, is seen that the apertures 32 formed in the inner housing 30 communicate with the space 21 behind the disc-like portion 18 forming the lease of the piston. The fuse 34 ignites the pyrotechnic material 33 within the igniter housing 30, and a flame passes through each aperture 32. The fuse is selected so that this happens at the same instant that the fuel starts to flow through the tubes 24. Thus, in a combustion zone 46 as shown in FIG. 3, within the space 21 and adjacent the aperture 32, fuel passing through a tube 24, mixed with gas containing oxygen passing through the cranked air passage 22 is ignited by a flame emerging through the aperture 32. The combustion products pass through a passage 47 defined between the tapered portion 23 provided at the rear of the tubular flange 19 provided on the piston 17 and the free end of the spigot 9 of the plug 7, to the space is there the combustion products are mixed with further oxygen-containing gas from the space 2 within the bottle 1 which passes through the passage 45. Thus, in this space 15, any remaining fuel not fully burnt in region 46, or any carbon monoxide present, is further combusted. The combusted gas flows through the filter 16 and out through the air passages 14 formed in the flange 8 of the plug 7.

The filter 16 filters out any ash or other solids. The filter 16 also provides a certain flow restriction, thus providing a back pressure necessary for ideal combustion to occur. Also the filter becomes hot, and ensures uniform heating of all the gas and combustion products leaving the gas generator.

The flame from the igniter housing 30 burns for about 40 milliseconds. At the end of this period the fuel is exhausted, all of the compressed gas has escaped from the interior 2 of the gas bottle 1 and the air bag is fully inflated.

It is to be noted that the gas passing out of the gas generator comprises a mixture of combustion products and nitrogen. The nitrogen gas is heated by the combustion process. This heating counteracts the cooling effect that is experienced when a compressed gas is expanded. Thus the gas provides the optimum effect of inflating an air bag.

Since the compressed gas is used as an oxidant, heat is transferred to the gas more efficiently than using a conventional pyrotechnic material to heat the gas, where the pyrotechnic material itself contains the necessary oxygen for the combustion to take place.

It is also to be appreciated that the fuel is kept totally separate from the oxygen necessary for the fuel to combust, until the device has actually been triggered. While the oxygen in this embodiment is present in the form of a compressed oxygen-containing gas, which presents the various advantages described above, the oxygen could be present in an appropriate liquid which is initially kept separate from the combustible fuel. Since the fuel and the oxygen are kept separate, there is only a minimal risk of the fuel combusting inadvertently.

It is to be observed the combustion takes place in two distinct steps in order to minimize the amount of carbon monoxide, and other toxic combustion products, in the gas that is eventually supplied to the air bag.

Referring now to FIGS. 4 to 7 of the accompanying drawings, a second embodiment of the invention is illustrated.

This embodiment comprises a cylindrical gas bottle 50 which is closed at one end and which defines a hollow interior 51 which contains a compressed gas, The compressed gas may be compressed air or may be an inert gas such as argon or nitrogen, or a mixture of such inert gases. Preferably, however, the gas comprises at least some oxygen. The gas may have a pressure of approximately 200 bars.

The cylindrical gas bottle 50 has a closed end and an open end 52. Received within the open end 52 is a tubular housing 53 formed of an appropriate material, the tubular housing having, adjacent the open end 52 of the bottle 50, an outwardly directed flange 54 carrying a terminal lip 55 which is in substantially sealing-tight engagement with the interior of the open end 52 of the bottle.

A plug 56, having a terminal flange 57 and an axially extending hollow spigot 58 is inserted into the end of the tubular housing 53, the flange 57 of the plug 56 serving to force the lip 55 of the housing 53 into firm engagement with the interior of the open end 52 of the gas bottle 50. The hollow spigot 58 contains a cylindrical insert 59, which comprises an electrically activated squib. The exterior of the insert 59 defines a seat 60 which receives a tubular projection 61 formed integrally with a cover 62, the cover comprising a disc-like portion which is spaced from the open end 52 of the bottle 50. The disc-like portion of the cover 62 carries a sleeve 63 which substantially surrounds part of the gas bottle 50, a passage 64 for combustion gases, as will be described hereinafter, being defined between the sleeve 63 and the exterior of the bottle 50.

A plurality of evenly spaced apertures or air passages 65 are formed in the flange 57 of the plug 56, communicating with the interior of the housing 53. An annular filter 66 is provided which surrounds the spigot 58 of the plug 56, engaging the exterior of the spigot 58 and the interior of the housing 53, the filter 66 being located in the flow passage which leads to the air passages 65. A cylindrical space 67 is formed between the housing 53 and the spigot 58 adjacent the filter 66.

Figure 5:
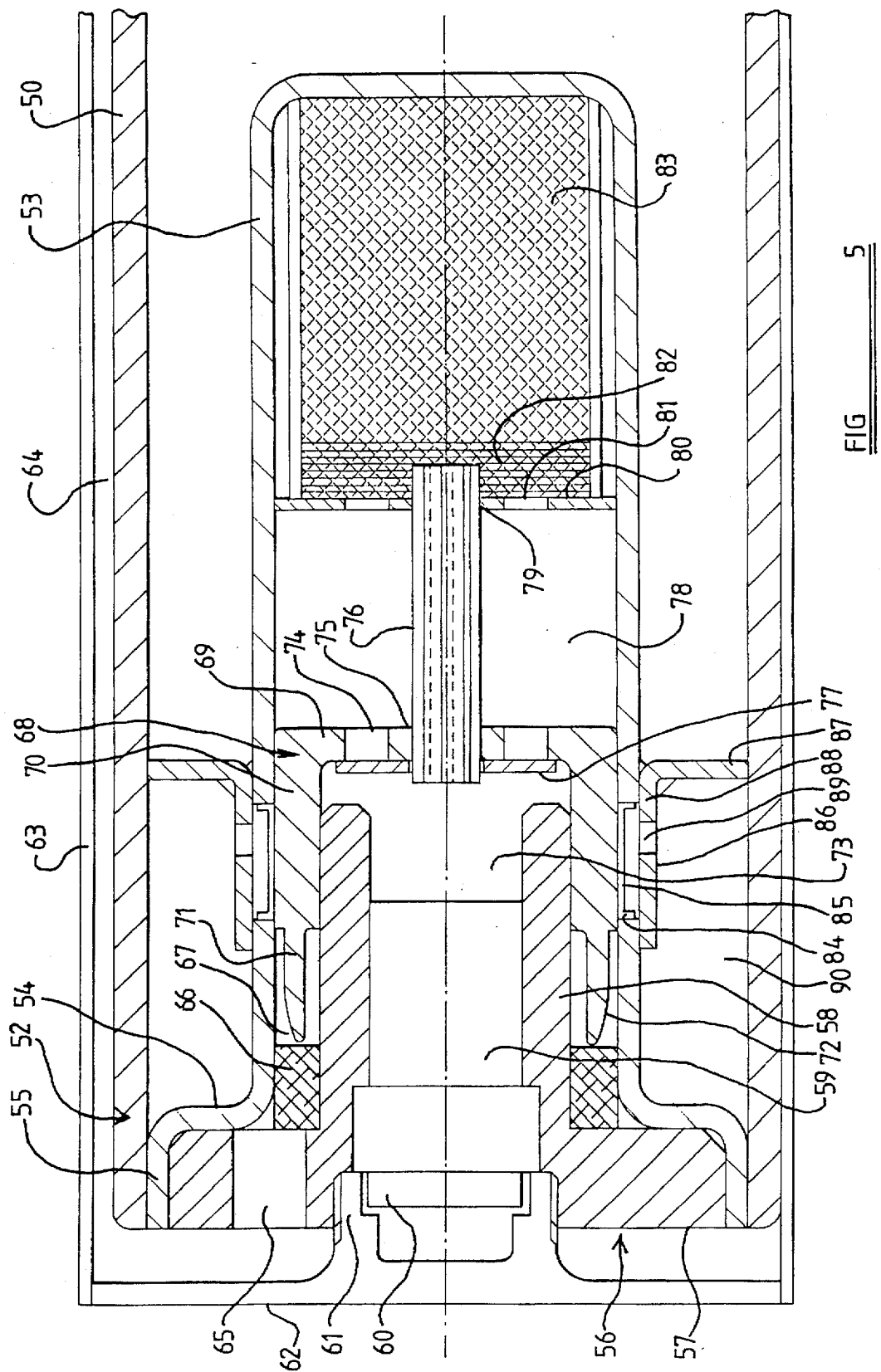
FIG. 5 is an enlarged view of part of FIG. 4.

A piston 68 is mounted for axial sliding movement within the housing 53. The piston 68 comprises a disc-like part 69 which is a substantially sealing sliding fit within the cylindrical interior of the cylindrical housing 53. The disc-like part 69 carries a rearwardly extending tubular flange 70 having an external diameter which is substantially equal to the internal diameter of the housing 53. The flange 70 extends towards the left as illustrated in FIG. 5. The interior of the flange 70 slidingly engages the spigot 58. The flange 70 terminates with a rearwardly extending projection 71. The projection 71 has a greater internal diameter than the internal diameter of the main rearwardly extending flange 70 and a lesser external diameter than the external diameter of the main rearwardly extending flange 70. Thus, the rearwardly extending projection 71, although it comprises a flange of substantially the same overall diameter as the flange 70. is stepped inwardly both from the exterior and from the interior of the flange 70. The terminal external region of the projection 71 is tapered inwardly, as shown at 72 in FIG. 5.

A space 73 is defined between the insert 59 and the disc like part 69 forming the operative part of the piston 68.

The disc-like part 69 forming the operative part of the piston 68 is provided with a plurality of evenly spaced through-apertures 74. A centrally located aperture 75 is provided through which extends a fuse 76. An annular plate 77 is provided located within the space 73 abutting the rear face of the disc-like part 69 that forms the operative part of the piston 68. The central aperture in the annular plate 77 surrounds part of the fuse 76 which extends through the annular plate 77, and the annular plate 77 effectively seals the through-apertures 74 formed in the disc-like part 69 that forms the operative part of the piston 68.

A space 78 is defined in front of the piston 68, and the fuse 76 extends across the space 78. The fuse passes through a central aperture 79 formed in a partition 80 which extends across the interior of the housing 53. The partition 80 is provided with a plurality of through-apertures 81 substantially aligned with the apertures 74 formed in the disc-like part 69 of the piston 68.

A filter material 82 is located adjacent the apertures 81 and a pyrotechnic material 83 adjacent the filter material.

A plurality of apertures 84 are provided in the inner housing 53 in the region of the flange 70 provided on the piston 68, when the piston 68 is in the initial position as illustrated. Each aperture 84 is sealed initially by a sealing disc 85. Each sealing disc 85 is a thin steel disc, approximately 0.25 mm thick. Each disc is welded or soldered in position. The inner surface of each disc 85 is substantially flush with the interior of the housing 53. Thus each disc is supported by the exterior part of the rearwardly extending flange 70 forming part of the piston 68, when the piston 68 is in the position illustrated in FIG. 5.

A slide 86 is provided which is of annular form and which surrounds the inner housing 53. The slide 86 presents a substantially radially outwardly directed annular flange 87 which extends from the housing 53 to the interior of the gas bottle 50. The slide 86 further incorporates a tubular portion 88 which effectively surrounds the housing 53, the portion 88 defining a plurality of relatively small through-apertures 89, which, in an initial position at the slide 86 are substantially aligned with the apertures 84 formed in the inner housing 53. The slide 86 may be initially soldered into position with one or two small spots of solder. The flange 87 defines a region 90 of the interior of the gas bottle 50 which is located between the radially extending flange 87 formed on the slide 86, and the outwardly directed flange 54 formed on the inner housing 53.

The illustrated gas generator is adapted to be activated in response to a signal from a sensor, the sensor being adapted to provide the signal in response to deceleration in excess of a predetermined limit or a collision. The signal ignites the squib 59. The squib 59, when ignited, generates gas which is supplied to the space 73 between the squib 59 and the piston 68. Because the plate 77, effectively seals the apertures 74 formed in the disc-like part 69 forming the operative part of the piston 68, the space 73 is substantially sealed, and the pressure rise caused when gas is supplied from the squib to that place causes the piston to move towards the right as shown in FIG. 5.

As the piston moves towards the right the projection 71 which is substantially aligned with the flange 70 is brought into alignment with the apertures 84. The discs 85 can thus no longer rest on the exterior of the flange 70. Compressed gas within the region 90 passes through the relatively small apertures 89 and exerts pressure on the sealing discs 85. The sealing discs break and move inwardly. The sealing discs may open in the manner of a door, particularly if the forward edge of each sealing disc is secured rather more firmly to the inner housing 53 than the trailing edge of each sealing disc. As the piston 68 continues to move forwardly the disc initially opens in a gradual manner, with the disc engaging the exterior of the rearwardly extending projection 71, but as the piston continues to move forwardly each disc moves gradually down the tapered portion 72 of the rearwardly extending projection 71, the disc thus opening in a gradual and controlled manner.

When each disc 85 opens compressed gas from the region 90 flows through the opening, through the space 67 and thus through the filter 66, the gas thus passing through the flow passages 65 and along the flow path 64 defined between the outer sleeve 63 and the exterior of the gas bottle 50, the gas thus commencing the inflation of the air bag.

Since gas from within the region 90 within the interior of the gas bottle 50 is escaping, the pressure within that region will drop. Consequently the pressure applied to the forward side of the annular flange 87 present on the slide 86 will exceed the pressure applied to the rearward face of that flange, and, when a pre-determined threshold has been reached, the solder retaining the slide 86 in position will break, and the slide will move rearwardly, that is to say towards the left. Thus gas will then be able to flow instead of through the relatively small apertures 89 formed in the tubular part 88 of the slide 86, through the entire open area of the apertures 84. Thus the rate of flow of gas increases.

The activation of the squib will have ignited the fuse 76. The fuse 76 burns for a predetermined period of time and then ignites the pyrotechnic material 83.

When the pyrotechnic material 83 is ignited, combustion gas flows through the filter 82 and through the apertures 81 formed in the partition 80. By this time the piston 68 has moved to the position illustrated in FIG. 7 in which the front face of the disc-like part 69 is abutting the partition 80. The through-apertures 74 formed in the piston are aligned with the through-apertures 81 formed in the partition 80. Combustion gas from the pyrotechnic material 83 can thus flow through the apertures 74. The pressure of combustion gas exceeds the pressure within the spathe 73 behind the piston, and thus the combustion gas moves the plate 77 towards the left. The plate 77 moves until it engages the end of the inwardly directed spigot 58. Combustion gas can then flow between the rearwardly extending projection 71 provided on the annular flange 70 and the free end of the spigot 58, the combustion gas thus flowing into the space 67 and mixing with compressed gas flowing from the interior 51 of the gas bottle 50. If the gas contained within the interior 51 of the gas bottle 50 is air or other oxygen-containing gas, then the combustion gas of the pyrotechnic material may be further oxidized when the combustion product of the pyrotechnic material is mixed, in the region 67, with the gas from the interior of the gas bottle 50.

The filter 66 may help ensure that the pressure within the region 67 is an appropriate pressure for such a combustion process, by providing a certain back pressure. The filter 65 also provides a heat exchanger effect, ensuring uniform heating of the gases passing through the filter and flowing out of the gas generator through the gas flow passages 65.

It is to be appreciated that in operation of the gas generator of FIGS. 4 to 7 initially gas within the space 90 partially inflates the air bag, and subsequently compressed gas, which is heated by the combustion products of the pyrotechnic material 83 completes the inflation of the air bag.

Whilst, in the described embodiment, a piston is described which moves in response to ignition of a squib, it is to be appreciated in an alternative embodiment of the invention that the piston may be replaced by any movable element, the movable element being biassed initially by a spring, but being retained in an initial position by a triggering means which, on activation, releases the movable element so that the movable element can then move under the bias applied to it by the spring.

We claim:

1. A gas generator comprising
   (a) a bottle defining an inner bottle space containing compressed gas and an outlet passage through which the compressed gas may flow out of said bottle;
   (b) a housing supported within said bottle; said housing having a side wall defining an inner housing space communicating with said outlet passage;
   (c) a movable element disposed in said housing and being displaceable therein in a direction of motion along said side wall between an initial position and an advanced position;
   (d) externally actuatable triggering means positioned in said housing for propelling said movable element from said initial position into said advanced position;
   (e) an aperture provided in said side wall of said housing for establishing communication between said inner bottle space and said outlet passage through said inner housing space; and (f) a sealing disc secured to said side wall and obturating said aperture for preventing communication between said inner bottle space and said outlet passage; said sealing disc having a surface flush with an inner face of said side wall of said housing; in said initial position of said movable element said sealing disc being pressed into engagement with said movable element by the pressure of the compressed gas in said inner bottle space; in said advanced position of said movable element said movable element being remote from said aperture and said sealing disc, whereby pressure of the compressed gas in said bottle space removes said sealing disc for allowing the compressed gas to flow out of the inner bottle space through said aperture, said inner housing space and said outlet passage; said direction of motion of said movable element being parallel to said surface of said sealing disc.

2. The gas generator as defined in claim 1, wherein said sealing disc is provided with a flange.

3. The gas generator as defined in claim 2, wherein said flange of said sealing disc is welded to the housing.

4. The generator as defined in claim 2, wherein said flange of said sealing disc is soldered to the housing.

5. The gas generator as defined in claim 1, wherein said movable element is a piston and said triggering means is a squib.

6. The gas generator as defined in claim 1, further comprising a combustible material accommodated in said inner housing space and being ignitable by said triggering means for heating the compressed gas.

7. The gas generator as defined in claim 6, wherein said combustible material is a pyrotechnic material.

8. The gas generator as defined in claim 6, wherein said combustible material is a fuel and further wherein the compressed gas contains oxygen consumable upon burning of the fuel.

9. The gas generator as defined in claim 1, further comprising a filter through which the compressed gas flows prior to passing through said outlet passage.

10. A gas generator comprising
(a) a bottle defining an inner bottle space containing compressed gas and an outlet passage through which the compressed gas may flow out of said bottle;
(b) a housing supported within said bottle; said housing having a side wall defining an inner housing space communicating with said outlet passage;
(c) a movable element disposed in said housing and being displaceable therein in a direction of motion along said side wall between an initial position and an advanced position;
(d) an externally actuatable squib positioned in said housing for propelling said movable element from said initial position into said advanced position;
(e) a fuse disposed in said housing and ignitable by said squib;
(f) a combustible material disposed in said housing and being ignitable by said fuse after a predetermined delay to burn in a combustion zone;
(g) an aperture provided in said side wall of said housing for establishing communication between said inner bottle space and said outlet passage through said inner housing space; and
(h) a sealing disc secured to said side wall and obturating said aperture for preventing communication between said inner bottle space and said outlet passage; in said initial position of said movable element said sealing disc being pressed into engagement with said movable element by the pressure of the compressed gas in said inner bottle space; in said advanced position of said movable element said movable element being remote from said aperture and said sealing disc, whereby pressure of the compressed gas in said bottle space removes said sealing disc for allowing the compressed gas to flow out of the inner bottle space through said aperture, said inner housing space and said outlet passage.

11. The gas generator as defined in claim 10, wherein said fuse extends directly into a pyrotechnic material.

12. The gas generator as defined in claim 10, wherein the compressed gas contains oxygen; further comprising
(i) a reservoir disposed in said housing and containing fuel; said fuel constituting said combustible material;
(j) means for rupturing said reservoir upon movement of said movable element into said advanced position to effect a mixing of the compressed gas and the fuel; and
(k) means for directing the compressed gas/fuel mixture into said combustion zone.

13. A gas generator comprising
(a) a bottle defining an inner bottle space containing compressed gas and an outlet passage through which the compressed gas may flow out of said bottle;
(b) a housing supported within said bottle; said housing having a side wall defining an inner housing space communicating with said outlet passage;
(c) a movable element disposed in said housing and being displaceable therein in a direction of motion along said side wall between an initial position and an advanced position; said movable element having a first portion and a tapered, second portion;
(d) externally actuatable triggering means positioned in said housing for propelling said movable element from said initial position into said advanced position;
(e) an aperture provided in said side wall of said housing for establishing communication between said inner bottle space and said outlet passage through said inner housing space; and
(f) a sealing disc secured to said side wall and obturating said aperture for preventing communication between said inner bottle space and said outlet passage; in said initial position of said movable element said sealing disc being pressed into engagement with said first portion of said movable element by the pressure of the compressed gas in said inner bottle space; in said advanced position of said movable element said movable element being remote from said aperture and said sealing disc, whereby pressure of the compressed gas in said bottle space removes said sealing disc for allowing the compressed gas to flow out of the inner bottle space through said aperture, said inner housing space and said outlet passage; said tapered, second portion of said movable element being in engagement with said sealing disc during motion of said movable element from said initial position to said advanced position for gradually opening said aperture.

* * * * *